US008453261B2

(12) United States Patent
Morin et al.

(10) Patent No.: US 8,453,261 B2
(45) Date of Patent: May 28, 2013

(54) SYSTEMS AND METHODS FOR SECURING THE POWER SUPPLY OF COMMAND MEANS OF A MICROCIRCUIT CARD IN CASE OF ATTACK

(75) Inventors: Nicolas Morin, Levallois Perret (FR); Christophe Giraud, Levallois Perret (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 13/324,780

(22) Filed: Dec. 13, 2011

(65) Prior Publication Data
US 2012/0151608 A1      Jun. 14, 2012

(30) Foreign Application Priority Data
Dec. 14, 2010   (FR) ...................................... 1060465

(51) Int. Cl.
*G06F 21/00* (2006.01)
*G06F 11/30* (2006.01)

(52) U.S. Cl.
USPC ................. 726/36; 726/34; 726/35; 713/330; 713/340

(58) Field of Classification Search
USPC ........................................................... 726/36
See application file for complete search history.

(56) References Cited

U.S. PATENT DOCUMENTS
2008/0260150 A1*   10/2008   De Clercq ..................... 380/255

FOREIGN PATENT DOCUMENTS
EP      1 113 386 A2      7/2001
EP      2 164 031 A1      3/2010

* cited by examiner

*Primary Examiner* — Longbit Chai
(74) *Attorney, Agent, or Firm* — Arent Fox LLP

(57) ABSTRACT

This microcircuit card includes means for detecting an attack on the card, command means (130) capable of charging a charge pump (120) capable of applying a programming voltage (UP) to command a write operation into a cell (110) of a nonvolatile memory when an attack is detected, and a capacitor (140) arranged so as to be supplied with power during normal operation and to supply said charge pump (120) with power only when an attack is detected. The card (100) being characterized in that said capacitor (140) also supplies power to the command means (130) when an attack is detected.

10 Claims, 2 Drawing Sheets

SYSTEMS AND METHODS FOR SECURING THE POWER SUPPLY OF COMMAND MEANS OF A MICROCIRCUIT CARD IN CASE OF ATTACK

BACKGROUND OF THE INVENTION

The present invention is situated in the field of protection of electronic modules.

It applies especially but without limitation to the protection of a microcircuit card, for example one complying with the ISO 7816 standard.

Within the scope of microcircuit card protection against fault injection attacks, a known countermeasure consists of writing a predetermined value into a reserved area of a nonvolatile memory of the card when a disruption is detected, the content of this area being checked by the card at the beginning of each command; when this content is equal to the aforementioned predetermined value, the card refuses to execute the command and the card becomes unusable.

In known fashion, a write operation into nonvolatile memory is compulsorily preceded by the charging of a charge pump, which involves a very noticeable increase in the current consumption of the card.

This sudden variation can be observed by simple power analysis (SPA) using a resistor in series with the card.

It is therefore possible, for an attacker having a charge pump charging detection module available, to bypass the countermeasure described earlier by immediately cutting off the power supply of the card to prevent the writing of the predetermined value into the area, when it detects a rise in power consumption that is not usual in normal operation and therefore representative of the fact that the card is trying to make itself inoperable.

The invention offers a solution to this problem.

OBJECT AND SUMMARY OF THE INVENTION

More precisely, the invention relates to a module comprising:

means for detecting an attack on this module;

command means capable of charging a charge pump capable of applying a programming voltage to command a write operation into a nonvolatile memory cell when an attack is detected; and a capacitor arranged so as to be supplied with power during normal operation and to supply power to the charge pump only when an attack is detected.

This module is notable in that the capacitor also supplies the command means with power when an attack is detected.

In conformity with the invention, and with particular advantage, the discharge of the capacitor is not detectable by analysis of the power consumption of the microcircuit card.

Further, due to the fact that the capacitor also supplies power to the command means when the attack is detected, an attack aiming to cut off power supply to the microcircuit card would be ineffective.

In one particular embodiment of the invention, the command means include a flip-flop and a NOT gate, the output of the gate being at a first normal level in normal operation and at a second level when an attack is detected.

The nonvolatile memory cell can be a one-time programmable (OTP) cell or a cell of an EEPROM memory.

In one particular embodiment of the invention, the module includes a control signal, the level whereof is representative of the written or blank state of the EEPROM cell, this control signal being used for maintaining a vital signal of the module when an attack is detected.

This vital signal can be selected from among a reset signal, a clock signal or an input/output signal connected with equipment external to the module.

In another embodiment, the control signal is used to command a switch controlling the power supply to a vital component of the module.

This vital component can consist of a processor for example.

The switch can be a PMOS transistor.

In one particular embodiment of the invention, the module is a microcircuit card complying with the ISO 7816 standard.

BRIEF DESCRIPTION OF DRAWINGS

Other features and advantages of the present invention will appear from the description given below with reference to the appended drawings, which illustrate three embodiments that are in no way limiting in nature.

DETAILED DESCRIPTION OF THE INVENTION

Figure 1:
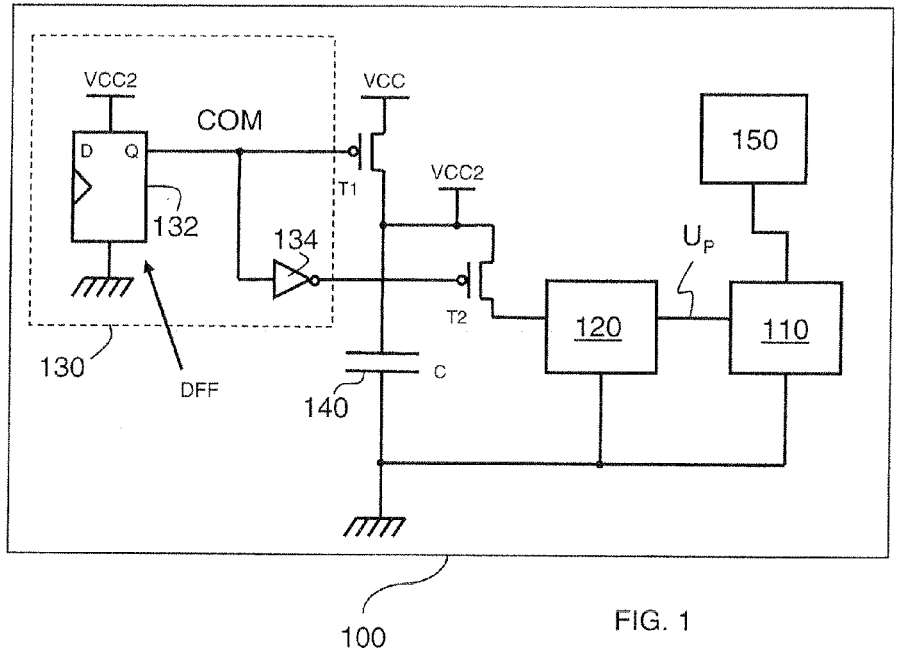
FIG. 1 illustrates a module 100 conforming to a first embodiment of the invention.

FIG. 1 shows a module 100 conforming to a first embodiment of the invention.

This module consists in this example of a microcircuit card complying with the ISO 7816 standard.

This microcircuit card includes a nonvolatile memory, consisting of a cell 110, this cell being programmable only once. This cell is known to the person skilled in the art under the name OTP (One Time Programmable) cell.

In conformity with the invention, the OTP cell 110 is designed to be modified to store a variable representing the detection of a malicious attack on the microcircuit card 100. Such an attack can for example be detected by carrying out an operation twice and comparing the corresponding outputs, but the detection of the proper attack is not the object of the invention.

In known fashion, the microcircuit card 100 includes a charge pump 120 implemented for writing a value into the OTP cell 110, any writing into a nonvolatile memory being preceded by charging of the charge pump 120, for applying a programming voltage UP to the cell, which involves a very noticeable increase in the current consumption in the microcircuit card.

This sudden variation can for example be observed by SPA (Simple Power Analysis) for example, by placing a resistor in series with the microcircuit card 100.

The microcircuit card 100 includes means 130 for commanding the writing of a variable into the OTP cell 110. More precisely, these means generate a command COM at a first level in normal operation (low level NB) and at a second level when an attack is detected (high level NH).

In the embodiment described here these command means include a D flip-flop 132 and a NOT gate 134. The D flip-flop 132 corresponds to a bit which controls the write operation into the OTP cell 110.

In other words, in this example, the detection of an attack results in flipping the output of the D flip-flop 132 from low level (NB) to high level (NH).

In conformity with the invention, the microcircuit card includes a capacitor 140 supplied in normal operation with a voltage VCC.

In the embodiment described here, one lead of the capacitor 140 is connected to a switch T1, which is conducting during normal operation so as to be able to charge the capacitor. This switch T1 consists of a PMOS transistor connected directly to the output of the D flip-flop 132, which is at low level (NB) in normal operation.

The charge pump 120 is also controlled by the command means 130, the command means 130 preventing power supply to the charge pump during normal operation.

More precisely, in the embodiment described here, one lead of the charge pump 120 is connected to a switch T2 that is non-conducting during normal operation. This switch T2 consists of a PMOS transistor connected, through a NOT gate 134, to the output of the D flip-flop 132.

In conformity with the invention, the capacitor 140 is designed to supply the charge pump 120 only when an attack is detected. In the embodiment described here, one lead of the capacitor 140 is connected to the switch T2.

When an attack is detected, the output of the D flip-flop 132 flips to high level (NH), which brings about the unblocking of the switch T2, the charging of the pump 120 by the capacitor 140 and a write operation to the OTP cell 110.

In the embodiment described here, a processor 150 of the microcircuit card monitors (polling, interrupts, . . . ) in software the content of the OTP cell in order to perform an action in response to the attack, this action not constituting a part of the invention.

In known fashion, it is necessary, for properly writing into the register 110, that the output of the D flip-flop remain at high level (NH) throughout the write operation.

It is possible, however, for an attacker, using EMA (Electromagnetic Analysis) for example, to detect the beginning of the discharge of the capacitor 140 into the charge pump 120 and to cut off power supply to the microcircuit card 100 in order to disrupt the output of the D flip-flop and hence the write operation into the OTP cell 110.

The invention resolves this problem by also supplying power to the command means 130 from the capacitor 140.

Thanks to the invention, and very advantageously, the discharge of the capacitor 140 is not detectable by analysis of the power consumption of the microcircuit card.

Consequently, in the embodiment described here, the capacitor 140 supplies power to the D flip-flop 132 and the NOT gate 134.

The flip-flop 132 can be written to by the processor 150 or by another hardware component.

In one variation, not shown, this flip-flop can be one bit of a specific register of the processor 150.

Figure 2:
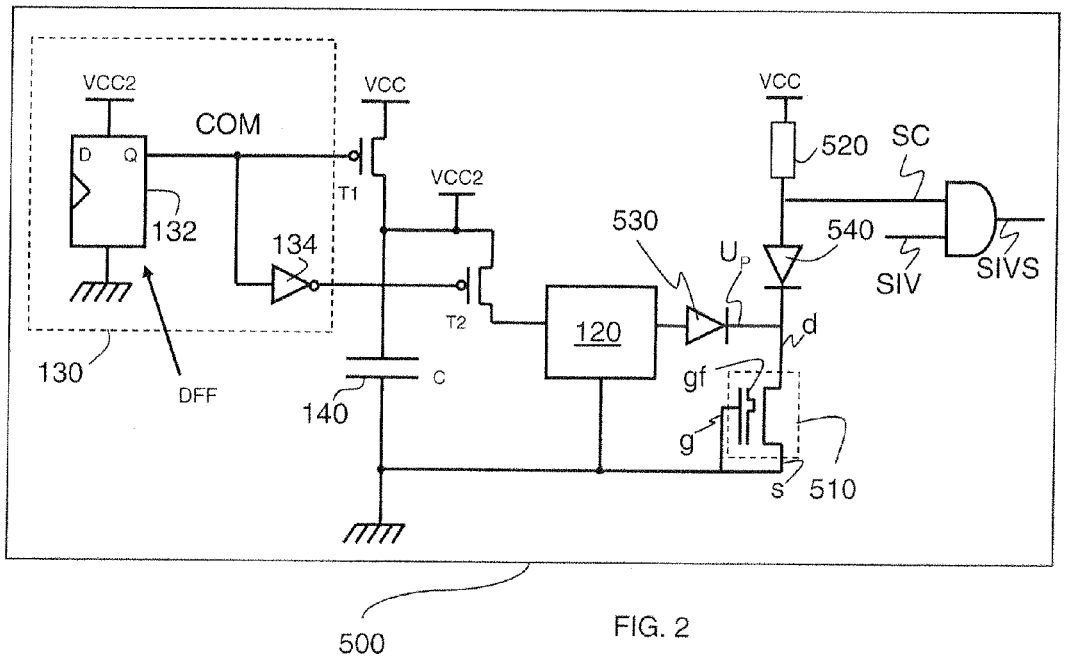
FIG. 2 illustrates a microcircuit card 500 conforming to another embodiment of the invention.

FIG. 2 shows a microcircuit card 500 conforming to another embodiment of the invention.

In this figure, the elements of the microcircuit card 500 that are similar to those of the microcircuit card 100 of FIG. 1 have the same reference symbols.

In this embodiment, the nonvolatile memory of the microcircuit card 500 is an EEPROM cell 510; the principle of this embodiment is to trigger a write operation into the EEPROM cell 510 by supplying power to the charge pump 120 when an attack is detected, and to flip a control signal SC, at high level in normal mode, to low level when a write operation into the EEPROM memory is carried out.

In the embodiment described here, the control signal SC is used to maintain a vital signal SIV of the microcircuit card 500 when an attack is detected by combining these signals SC, SIV by means of an AND gate.

This vital signal can for example be selected from among a reset signal (RESET), a clock signal (CLOCK), or an input/output (IO) signal connected with a reader of said microcircuit card.

The signal SIVS resulting from this logical AND is a vital signal protected by the invention.

In the embodiment described here, the drain d of the EEPROM cell is connected to the output of the charge pump 120 and to the control signal SC so that the level of the control signal SC is representative of the written or blank state of the EEPROM cell 510.

In normal operation, the EEPROM cell 510 is blank and has a high impedance between its source s and its drain d, the gate being connected to ground. It behaves like an open switch; no current passes through it.

A resistor 520, a first lead whereof is connected to the voltage VCC and the other lead whereof is connected to the drain d, makes it possible to hold the signal SC at high level.

In this normal operating mode, the charge pump 120 is protected by a first diode 530 placed at its output.

When an attack is detected by the means 130, the switch T2 becomes conducting and the charge pump 120 sends a programming voltage UP (on the order of 15V for example) to the drain d of the EEPROM cell 510.

In known fashion, the floating gate gf of the EEPROM 510 then charges positively; a write operation is performed into the EEPROM 510 which brings about a drop in the threshold voltage (between the gate and the source), which becomes negative.

It is important to note that, during the entire duration of the write operation, the programming voltage UP is greater than VCC. In order to maintain the control signal SC at the VCC level and not at the level UP during the entire duration of the write operation, the microcircuit card 500 includes a second diode 540 placed in series between the drain d of the EEPROM 510 and the resistor 520 pulling the control signal SC.

This second diode 540 prevents connecting the charge pump 120 output with the control signal SC in order to protect the logic located behind this signal.

Once the write operation into the EEPROM is completed, it becomes conductive (the voltage between the gate and the source, which is 0 V, becomes greater than the threshold voltage), the impedance between the source s and the drain d being low compared with the resistor 520.

Consequently, the control signal SC flips to low level and the attack can be detected by logic monitoring this level.

Figure 3:
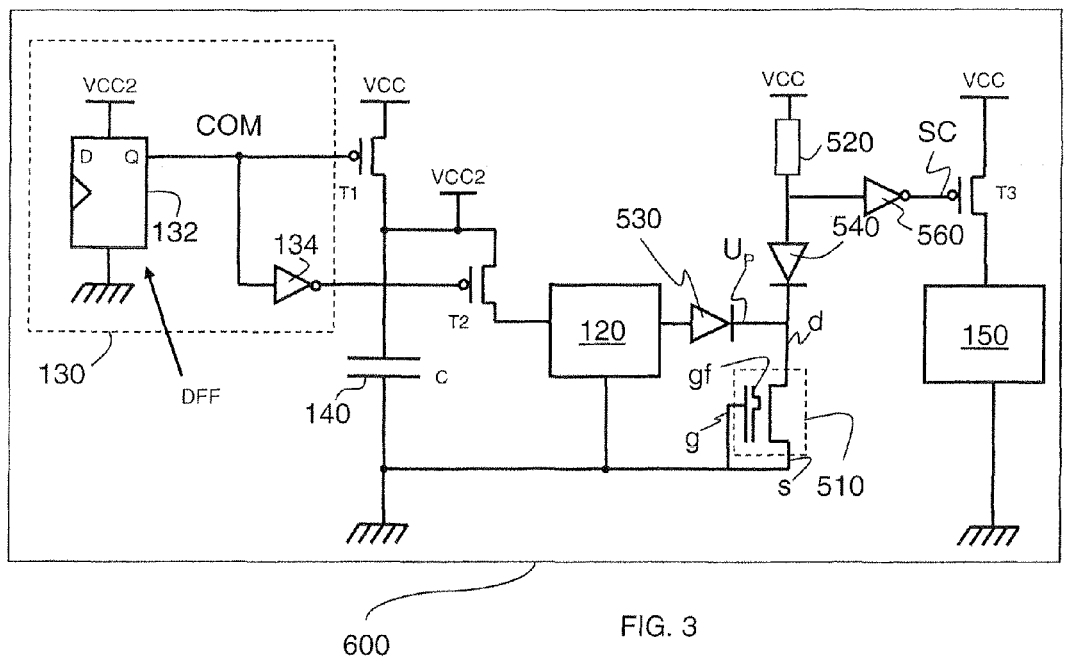
FIG. 3 illustrates a microcircuit card 600 conforming to another embodiment of the invention.

FIG. 3 shows a microcircuit card 600 conforming to another embodiment of the invention.

In this figure, the elements of the microcircuit card 600 that are similar to those of the microcircuit card 500 in FIG. 2 have the same reference symbols.

In this embodiment, the microcircuit card 600 has a NOT gate 560 for producing a control signal SC complementary to that of FIG. 2.

In other words, in this embodiment, the control signal SC is at low level (NB) in normal operation, and at high level (NH) in the event that an attack is detected.

This control signal SC controls a switch capable of cutting off power supply to a vital component of the card, to wit in this example that of a processor 150.

In the embodiment described here, this switch consists of a PMOS transistor T3.

More precisely, in the embodiment of FIG. 3, the microcircuit card 600 includes a transistor T3 controlled by the control signal SC in such a way that:

in normal operation, the control signal SC is at low level, and the CPU 150 is supplied with voltage VCC; and in the event that an attack is detected, the control signal SC flips to high level, and the CPU 150 is no longer supplied with power.

The invention claimed is:

1. A system of protection of electronic module including:
means for detecting an attack on said module;
command means capable of charging a charge pump able to apply a programming voltage to command a write operation into a cell of a nonvolatile memory when said attack is detected; and
a capacitor is configured so that power is supplied during normal operation and said charge pump is supplied only when said attack is detected on said module, wherein said module being characterized in that said capacitor also supplies said command means when said attack is detected.

2. A module according to claim 1, characterized in that said command means include a flip-flop and a NOT gate, the output of the flip-flop being at a first level during normal operation and at a second level when an attack is detected, said level remaining high during the entire duration of said write operation.

3. A module according to claim 1, characterized in that said cell is a one time programmable cell.

4. A module according to claim 1, characterized in that said cell is a cell of an EEPROM memory.

5. A module according to claim 4, characterized in that it includes a control signal the level whereof is representative of the written or blank state of said cell, this control signal being used to maintain a vital signal of said module when an attack has been detected.

6. A module according to claim 5, characterized in that said vital signal is selected from among a reset signal, a clock signal or an input/output signal connected with equipment external to said module.

7. A module according to claim 4, characterized in that it includes a control signal the level whereof is representative of the written or blank state of said cell, this control signal being used to command a switch controlling the power supply to a vital component of said module.

8. A module according to claim 7, characterized in that said switch is a PMOS transistor.

9. A module according to claim 7, characterized in that said vital component is a processor.

10. A module according to claim 1, consisting of a microcircuit card complying with the ISO 7816 standard.

* * * * *